US 6,593,669 B1

(12) United States Patent
Lemaire et al.

(10) Patent No.: US 6,593,669 B1
(45) Date of Patent: Jul. 15, 2003

(54) RECHARGEABLE OR NON RECHARGEABLE SMART BATTERY CELL AND PROCESS FOR THE PRODUCTION OF SUCH A CELL

(75) Inventors: Philippe Lemaire, Dommartemont (FR); Gerard Lemaire, Nancy (FR); Patrick Lorelle, Saint-Die (FR); Alain Limpas, Laxou (FR)

(73) Assignee: Technopuce International, Courcelles en Barrois (FR)

( * ) Notice: Subject to any disclaimer, the term of this patent is extended or adjusted under 35 U.S.C. 154(b) by 294 days.

(21) Appl. No.: 09/620,574

(22) Filed: Jul. 20, 2000

Related U.S. Application Data

(63) Continuation-in-part of application No. 09/180,468, filed as application No. PCT/FR97/00818 on May 7, 1997, now abandoned.

(30) Foreign Application Priority Data

May 7, 1996 (FR) .............................. 96 05881

(51) Int. Cl.[7] .............................................. H01M 10/46
(52) U.S. Cl. ................................................ 307/43; 429/7
(58) Field of Search ........................... 307/43; 324/425, 324/426, 428, 432; 320/112, 118, 136; 204/406, 288.1, 288.6, 229.8, 230.8; 429/7, 82, 127, 152, 162, 224, 229; 361/61, 121, 161, 91.2

(56) References Cited

U.S. PATENT DOCUMENTS 3,793,078 A    2/1974   Duncan et al.
4,062,750 A *  12/1977  Butler ......................... 204/279
4,504,120 A *  3/1985   von Alpen et al. .......... 359/270
4,874,500 A *  10/1989  Madou et al. ............... 204/408
5,043,651 A *  8/1991   Tamura ....................... 320/136
5,563,002 A    10/1996  Harshe
5,622,789 A    4/1997   Young
5,637,418 A *  6/1997   Brown et al. ................ 429/127
5,645,949 A    7/1997   Young
5,731,686 A *  3/1998   Malhi .......................... 320/134
5,897,522 A *  4/1999   Nitzan ......................... 428/209
5,925,479 A *  7/1999   Wei et al. .................... 324/426
5,990,659 A    11/1999  Frannhagen
6,074,775 A *  6/2000   Gartstein et al. ............. 429/53
6,156,450 A *  12/2000  Bailey ......................... 429/122
6,217,744 B1 * 4/2001   Crosby ........................ 204/400
6,379,513 B1 * 4/2002   Chambers et al. .......... 204/400

FOREIGN PATENT DOCUMENTS

EP    0 644 642       3/1995
WO    WO 00/62365  * 10/2000  .......... H01M/10/46

* cited by examiner

*Primary Examiner*—Brian Sircus
*Assistant Examiner*—Roberto J. Rios
(74) *Attorney, Agent, or Firm*—Young & Thompson

(57) ABSTRACT

A battery cell and a method of producing the cell. The cell includes a pair of electrodes and a smart electronic circuit having one or more active or passive components directly mounted on one of the electrodes, so that the electronic circuit is inside the electrodes and is electrically connected to the electrodes. The components are protected by a coating.

15 Claims, 10 Drawing Sheets

RECHARGEABLE OR NON RECHARGEABLE SMART BATTERY CELL AND PROCESS FOR THE PRODUCTION OF SUCH A CELL

This application is a continuation-in-part of Ser. No. 09/180,468 filed Nov. 9, 1998 now abandoned, which has the priority of French Application 96/05881 filed May 7, 1996, and International Application PCT/FR97/00818 filed May 7, 1997.

BACKGROUND OF THE INVENTION

Within the framework of prior studies carried out in the field of electronic marking and, more particularly, the effort against loss (French patent filed under the number 93 15063) we have observed that the energy sources, of the battery type, available on the market, do not correspond in most cases to the need for the electronic circuits used.

Conventional energy sources of self-contained or portable equipment, batteries and accumulators, are far from having ideal characteristics for the supply of modern electronic circuits.

Their voltage varies greatly in the course of their lifetime and their undesirable characteristics are their limited capacity, their size, their weight, and their cost of installation.

Most of these drawbacks could be corrected with the help of carefully selected mountings, external to the battery (see for example the patents WO 94/00888, EP 0 457 569, or FR 2 672 713).

Another major difficulty encountered, essentially with batteries, resides in the control:

of the quantity of energy available at any moment, in a battery, of the quantity of energy necessary to recharge it, of the control and estimation of the total lifetime of this battery, as a function of the conditions of use (number of cycles of charging and discharging, temperature of use, large current draws, frequency of current draws . . . ).

This difficulty of controlling the operation of a battery, and of the quantity of energy available, has not always been resolved in a satisfactory manner, until now, and the solutions brought to this problem remain overall solutions, external to the battery (see for example the patents EP 0 644 642, WO 92/16979 or WO 96/08846).

SUMMARY OF THE INVENTION

The invention has for its object the integration of an intelligence, in the form of one or several chips within the interior itself of each of the generator cells or electrochemical couples which constitute a battery, to control, directly on each of the elements, the parameters of the latter and to compute permanently the condition of the instantaneous health of the battery.

The invention thus permits providing smart batteries thanks to which it will be possible to control the matrices of energy sources, and hence to create a better adaptation between the electronic means used and the size of the energy source which itself is associated in the framework of microsystems of a very small consumption.

It is however necessary to give the following particularities:

electric batteries, designed for a single use, and hence discardable, are qualified from primary generators in that the electrical energy that they produce is introduced therein one time for all, during their production, in a chemical form.

This is in contrast to secondary generators which are batteries, true reservoirs that can be refilled during each recharge, from an external electrical energy source.

As to the latter, one can speak in present day terms of accumulators or batteries. However, this latter term is improper because it designates in fact any assembly of several elements, no matter what the type of battery.

For the sake of clarity, in the text, we will use:

the term "non-rechargeable battery" to designate a battery made of primary cells that are not rechargeable, the term "rechargeable battery" to designate a battery with secondary cells, which therefore are rechargeable, the term "battery cell" to designate an element (or electrochemical pair) rechargeable or not.

It is known that rechargeable and non-rechargeable batteries are constituted of several identical battery cells mounted at present in series but that they could be disposed also with certain precautions, in parallel. FIGS. 1 and 2 show respectively by way of example a mounting in series and in parallel of battery cells 10.

Whether rechargeable or non-rechargeable, with liquid or solid electrolyte, with a cathode that is polarizable or not, with oxygen or another gas, each battery cell is constituted of an anode, a cathode, an electrolyte, one or several separators, a casing permitting holding and protecting the assembly, and two external electrical connections.

There also exist other modifications of cells, with gas circulation, electrolyte circulation, sea water circulation, for example.

The invention seeks to provide a battery cell, rechargeable or not, comprising within the electrochemical couple, an electronic chip supplied by said generator, and adapted to fulfill various functions such as, by way of non-limiting example:

controlling the output voltage of the cell, controlling the current passing through the cell, monitoring one or several parameters such as the temperature or pH of the cell, computing the input or output energies, memorizing the results, transmitting data toward a centralized processing system, or quite simply providing a microsource of energy, rechargeable or not.

Certain of these uses are the object of prior patents (see for example the patents EP 0 350 235, WO 93/14612 or WO 95/12901) but, in all cases, the electronic parts are connected to the outside of the electrochemical couple constituting the cell, over conductors used to cause the electrical current to flow supplied by said electrochemical couple, toward the user circuit.

In the patent EP 0 644 642, the electronic circuit is generally positioned on a surface plate, in a space available between the interior of the housing and the electrochemical couple. It is also proposed to integrate this electronic circuit within the materials constituting the cell, but such a modified embodiment is not described. The connection of the chip is however provided only outside the electrochemical couple.

The present invention thus relates to a cell of a rechargeable or non-rechargeable battery, comprising an electrochemical couple constituted by two electrodes separated by an electrolyte, characterized in that it comprises an electronic circuit disposed within said electrochemical couple and electrically connected to the electrodes.

The generator according to the invention is further noteworthy in that:

at least one of the electrodes comprising a current collector, the electronic circuit is electrically connected to said collector, the electronic circuit is fixed on a current collector, the current collector is constituted by the metallic cladding of a printed circuit card on which is fixed the electronic circuit, the metallic cladding constituting the current collector covers the upper surface of said card, except for a central surface adapted for positioning the electronic circuit, the electric circuit having connecting terminals, openings are formed in the card at the points where said connection terminals will be located, the lower surface of the card carrying a metallized coating constituted by circuits independent from each other of which one is connected electrically to the cladding of the upper surface through an opening in the card, the connections are connected to the segments of the metallized coating of the lower surface of the card by microballs, the contacts are connected to the metallized coating surfaces of the lower surface of the plate by conductive wires, the electrolyte comprising a separator, the electronic circuit is fixed to said separator.

A process for the production of a cell according to the invention is characterized in that:

there is used a printed circuit card whose upper surface carries a metallic cladding adapted to constitute a current collector, said cladding covering the upper surface of said card, except a central surface adapted for positioning the electronic circuit and whose lower surface carries a metallized cladding constituted by segments independent of each other, of which one is electrically connected to the cladding of the upper surface through an opening in the card, an electronic circuit is used having connection contacts, openings are formed in the card at the points where said connection contacts will be located, the electronic circuit is secured to the printed circuit card, the connection contacts are electrically connected to the segments of the cladding of the oversurface of the card, the electronic circuit is coated with a protective molding, the electrochemical couple of the cell is constituted on the card used as a support for the collector, by forming a first electrode by deposition of material on the upper surface of the card, then by positioning the electrolyte and the second electrode on said first electrode, an electrical connection is formed between one of the lower cladding segments and the electrode, the electrochemical is enclosed in a housing.

A second process for production of a cell according to the invention is characterized in that:

there is used a separator as the electrolyte, an opening is cut in said separator, an electronic circuit is positioned in the opening and the connection contacts are connected to current collectors, a molding is carried out about said electronic circuit so as to ensure the protection and its securement to said separator, the electrodes on opposite sides of the separator are made to be in contact with the current collectors, the electrochemical couple is enclosed in a housing.

A third process for production of a cell according to the invention is characterized in that:

the electrochemical couple is produced by stacking elements constituting the first electrode with its collector, the electrode and the second electrode with its collector so as to leave an empty cavity, and by positioning in said cavity a portion of each of the collectors, the electric circuit is introduced into the cavity, the connection contacts are connected to said collectors by means of connections, the cavity is filled with resin so as to constitute the protective molding of said component, the electrochemical couple is enclosed in a housing.

The invention also provides a process for making a cell according to the invention, characterized in that the electronic circuit ensures a function of analysis of at least one parameter of the electrochemical couple and transmits this information to external control means.

The information is transmitted by a radio frequency modulation process superposed on the supply voltage through the connections of the electronic circuit to the electrodes of the electrochemical couple and the connections of the electrodes of the electrochemical couple to the terminals of the cell.

The electronic circuit can be of any type, it is for example constituted by a chip or by several active or passive components.

BRIEF DESCRIPTION OF THE DRAWINGS

The invention will be better understood from the description which follows, given by way of non-limiting example, with reference to the accompanying drawings, in which.

DETAILED DESCRIPTION OF THE PREFERRED EMBODIMENTS

The object of the invention is an assembly comprising an electronic circuit, for example constituted by a component 20 such as an electronic chip, disposed within elements constituting the electrochemical couple of a rechargeable or non-rechargeable battery cell, so as to constitute what could be called a rechargeable or non-rechargeable "smart cell".

Figure 8:
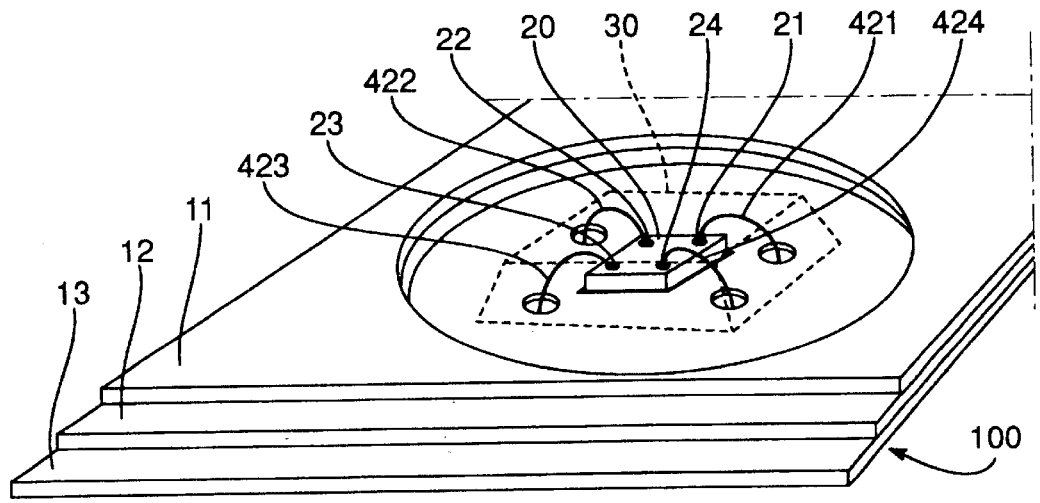
FIG. 8 is a schematic representation of the electrochemical couple of a cell according to the invention, FIGS. 9/1 to 9/8 show different phases of a process of assembly of an electronic circuit, constituted by a component directly positioned on a current collector of the cell.

There is schematically shown in FIG. 8 the electrochemical couple 100 of a cell, by three thin plates representing the electrodes 11 and 13 and the electrolyte 12. These elements can of course be of variable dimensions as a function of the characteristics of the destination of the cell. As shown in the drawing, the cell according to the invention comprises an electronic circuit, constituted for example by a component 20 having four connection contacts 21, 22, 23 and 24, disposed within the electrochemical couple 100 itself, in the internal volume of the latter. In a way known per se, the component 20 is enclosed in an epoxy resin molding 30 so as to be protected from outside attack. For its supply, as will be explained later but is not shown in FIG. 8, said component 20 is directly electrically connected to the electrodes of the cell.

In a manner known per se, the electrodes of an electrochemical couple 100 are constituted by a metal which is electrically conductive, or by a chemical component, for example an oxide, which does not conduct electricity. By way of example, a lithium battery comprises a lithium anode and a manganese oxide cathode. The lithium is a metal and hence conductive, whilst the manganese oxide is not conductive. So as to render possible the circulation of electrons, it is usual to use a current collector. This current collector can be constituted by a metallic sheet, for example of expanded metal, or by a grill of a non-conductive material, for example a cloth or plastic material, covered with a conductive coating. The collector is of course especially adapted for the non-metallic electrodes, but it is however often used also for metallic electrodes because it permits giving a mechanical resistance to these electrodes when they are not thick. It could also ensure an electrical continuity of the electrode when the material comprising said electrode thins out in the course of use of the cell.

The electronic component 20 introduced into the electrochemical couple of the cell according to the invention is thus connected to the anode and cathode current collectors when these are present.

So as to facilitate the assembly of the cell according to the invention, there are provided modified embodiments shown in FIGS. 9 and 11 to 13, to fix the electronic component 20 on one of the current collectors.

Figure 1:
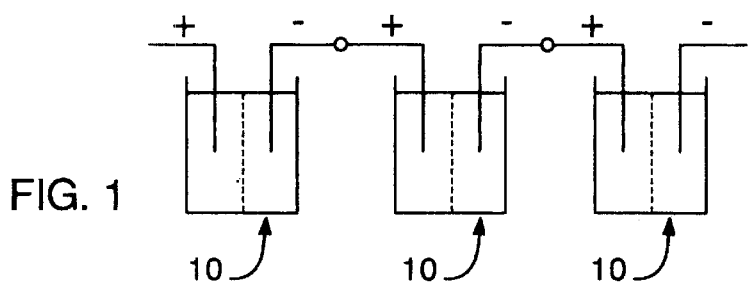
FIGS. 1 and 2 schematically show a series mounting and a parallel mounting of three cells.
Figures 1, 9:
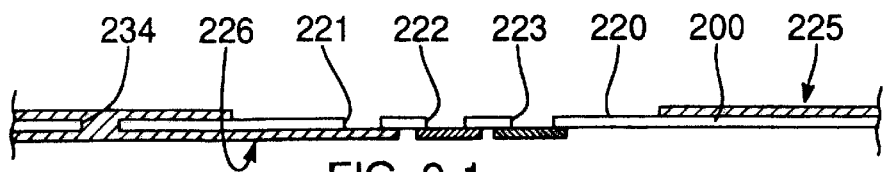
Figures 2, 9:
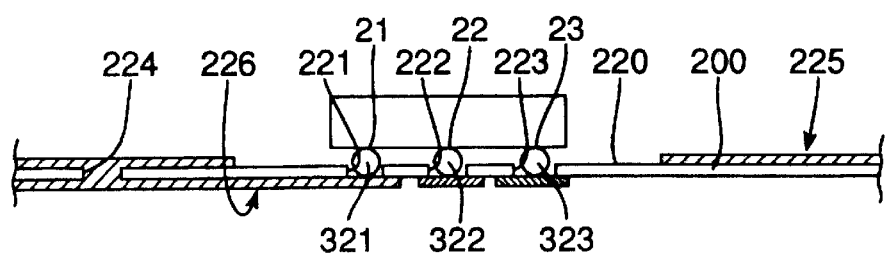
Figures 3, 9:
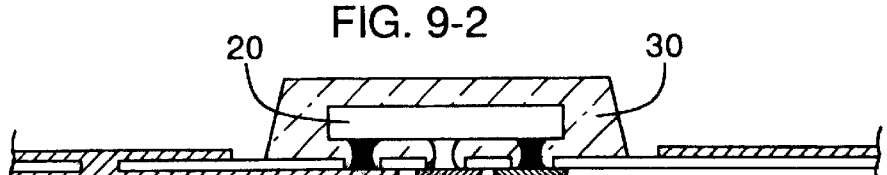
Figures 4, 9:
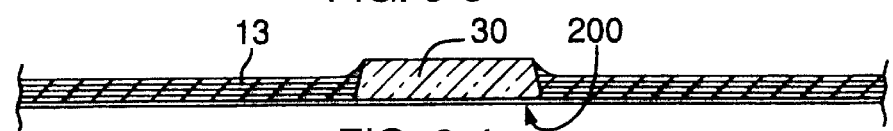
Figures 5, 9:
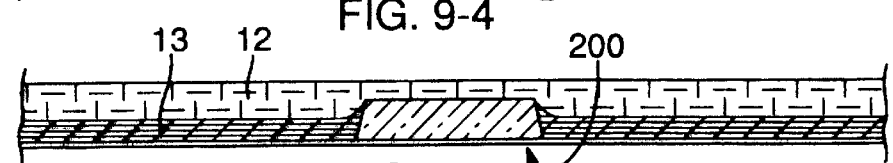
Figures 6, 9:
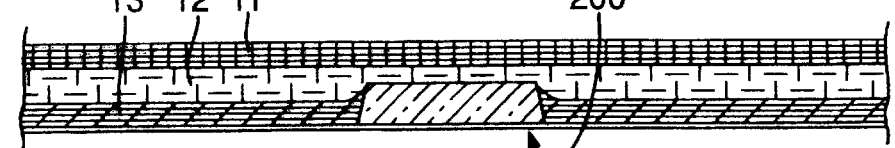
Figures 7, 9:
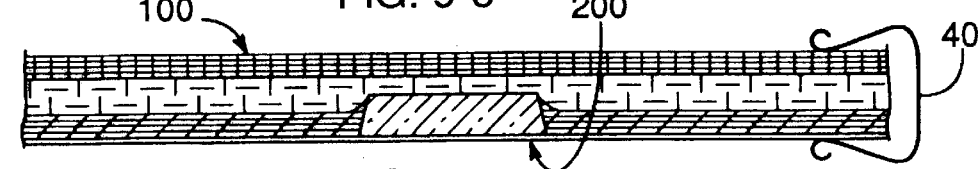
Figures 8, 9:
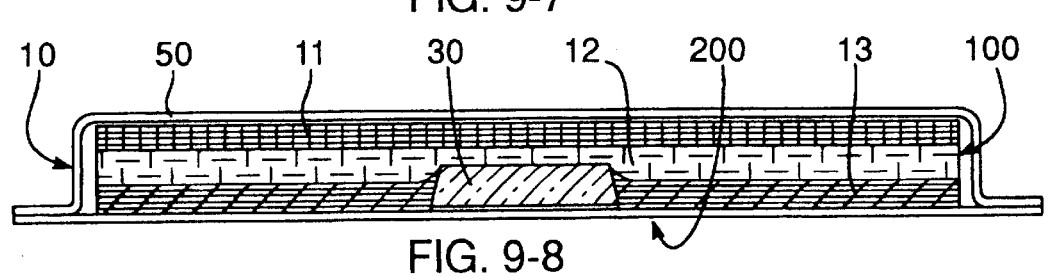
Figure 10:
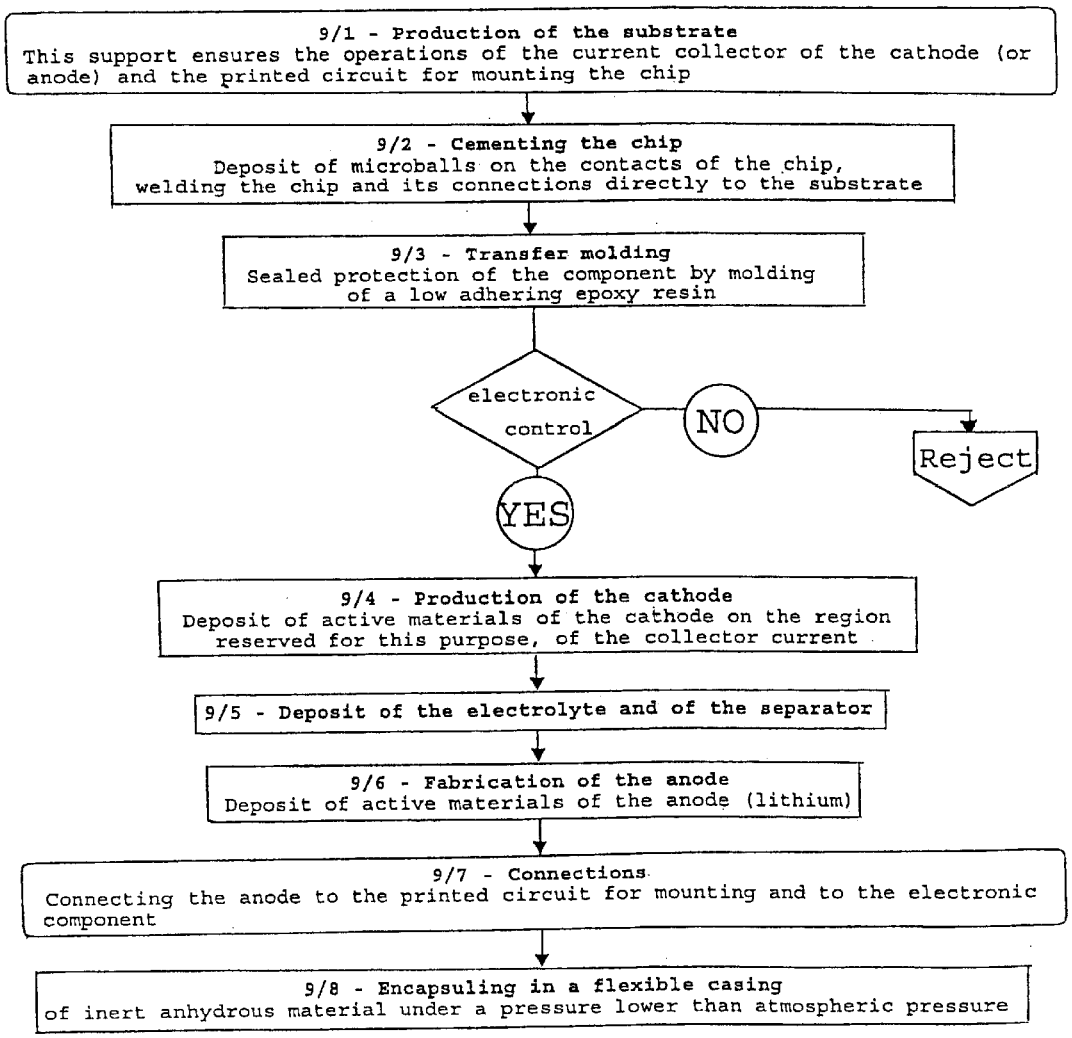
FIG. 10 is a logic diagram of the phases of the process of assembly shown in FIG. 9, FIGS. 11 and 12 are partial cross-sectional views and on an enlarged scale, at the level of the electronic component of two modified embodiments.

Refer now to FIGS. 9-1 to 9-8 as well as to the logic scheme of FIG. 10, to study in detail an embodiment of the assembly of a component 20, of which three connection contacts 21, 22 and 23 are visible, in the electrochemical couple 100 of a cell 10.

In this assembly mode, the printed circuit card 200 on which is fixed the component 20 is used as a current collector. This card 200 is metallized on two surfaces. The metallic cladding 225 disposed on the surface of the card 200 on which will be positioned the component 20, the upper surface in the illustrated example, covers practically all said card 200, except a central surface 220 adapted for the positioning of the component 20. Openings 221 to 223 are formed in the card 200 at the points where the connection contacts 21 to 23 of the electronic component 20 will be positioned. The opposite surface carries a metallized cladding 226 constituted by segments independent from each other of which one is electrically connected to the cladding 225 of the upper surface through an opening 234 in the card 200.

Figure 13A:
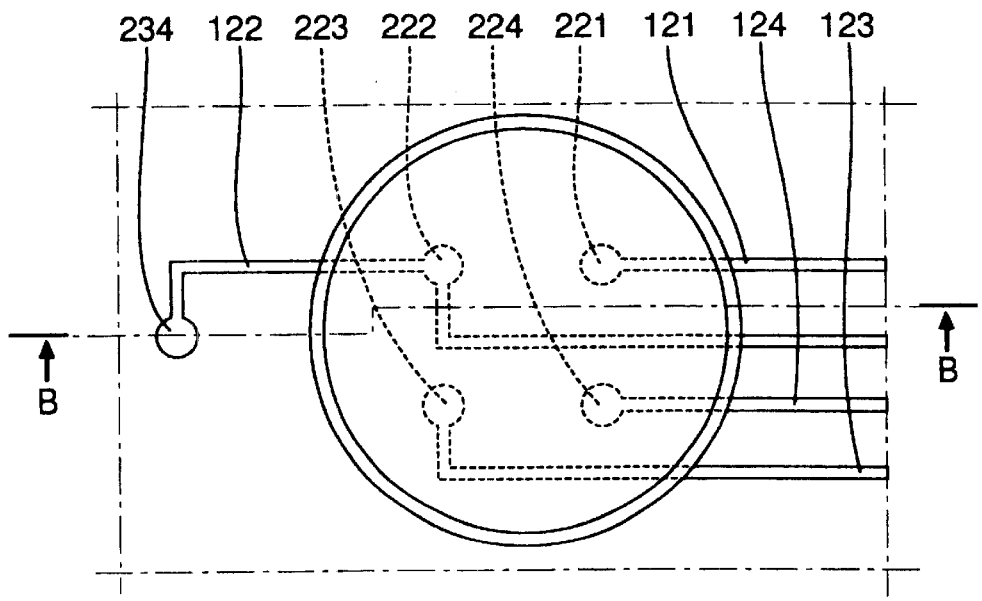
FIGS. 13a to 13c show respectively views from below, in cross section on the line B—B, and from above, the electrical connections between the chip and the electrochemical couple of a modified embodiment.
Figure 13B:
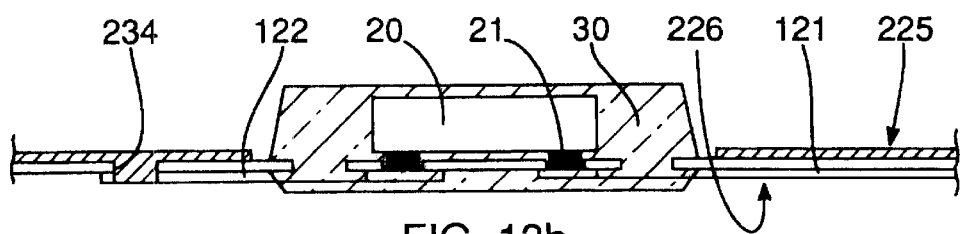
Figure 13C:
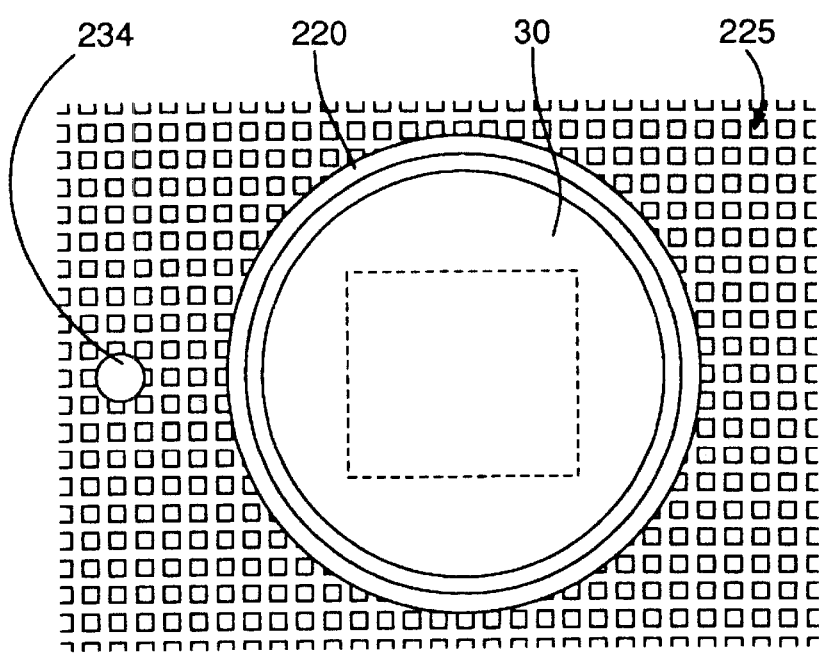

An example of embodiment applied to an electronic component 20 having four connection contacts 21 to 24 arranged in a square is shown in FIGS. 13a to 13c, but they can be arranged as a function of the number of connection components of the electronic component 20 and of their position.

FIG. 13a shows the lower surface of the card 200 carrying the electronic component 20 and constituting a current collector, cathodic or anodic, of the electrochemical couple of a cell according to the invention. The metal cladding 226 is constituted by four segments 121, 122, 123 and 124 connected to the openings 121 to 124 through which they will be connected to the connection contacts of the chip. The segment 122 is moreover connected to the opening 234.

In FIG. 13c is shown the upper surface of the card 200 having a cladding 225 which covers it practically completely, except for the free circular region 220 adapted to be secured to the molding 30 of transfer resin adapted to ensure the protection of the component 20.

This upper cladding 225, which extends over practically all the surface of the card 200, is adapted to constitute the current collector of the electrode 13.

Referring again to FIG. 9-2, there is shown the step in the course of which is performed the securement of the component 20 to the card 200 and the electrical connection of its connection contacts to the segments 121, 122 of the lower cladding 226.

So as to keep minimum size and simultaneously to ensure the securement of the chip and its electrical connection, it is possible to turn the chips over on its support and to make the connections by microballs 321, 322. Such a securement is visible on a larger scale in FIGS. 11, 14 and 15 for a component 20 of which only two connection contacts 21 and 22 are seen, the latter being adapted to have others outside the section plane.

Figure 12:
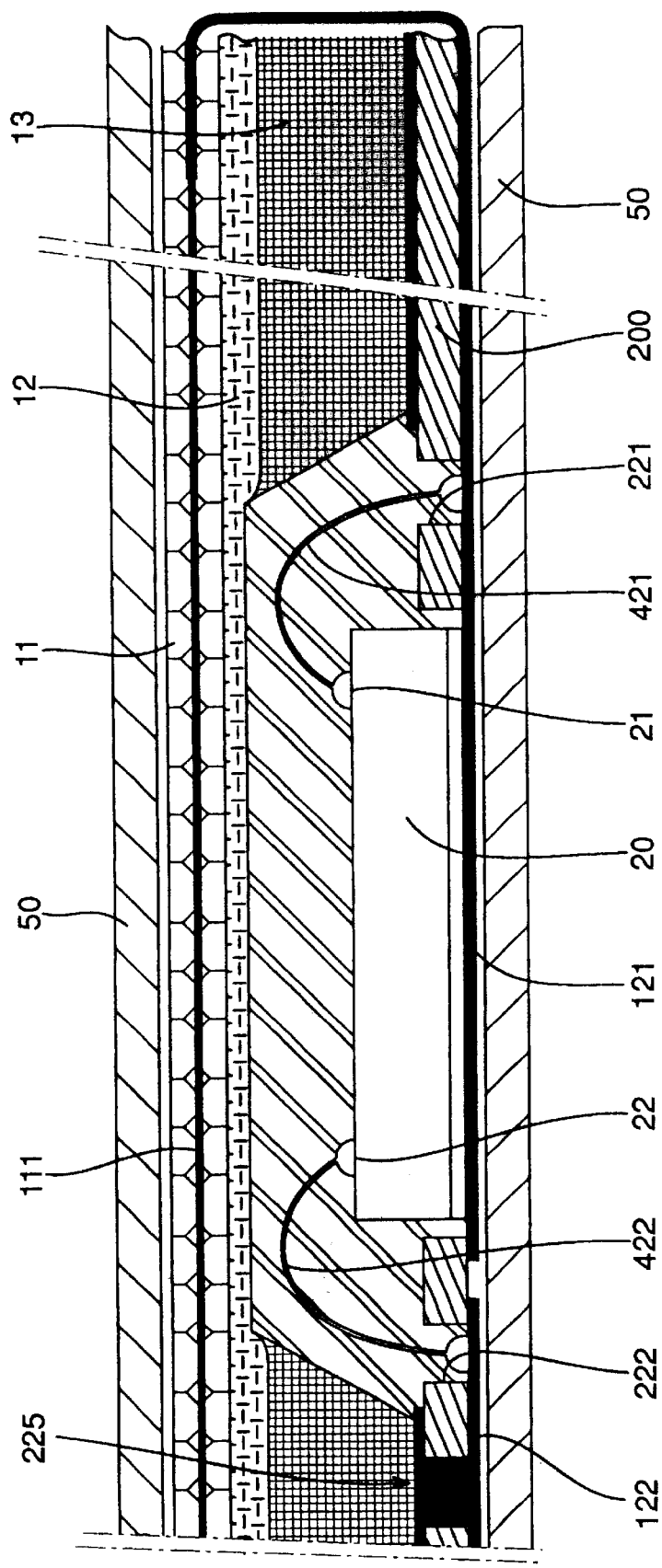

As a modification, as shown in FIGS. 8 and 12, the chip can be secured by its rear surface and produce the connection by conductive wires 421 to 424, for example of gold or aluminum.

Figure 3:
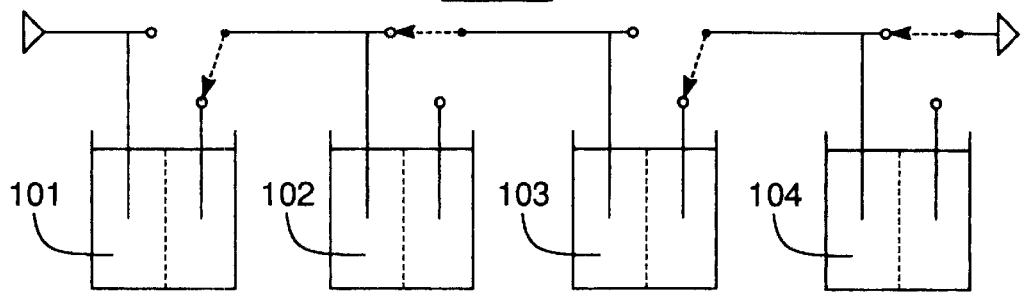
FIG. 3 shows a mounting in series of four elements in which it will be seen that the cells (101) and (103) are connected in series, whilst the cells (102) and (104) are on standby, either as an energy reserve or in case of malfunction.

The securement of the component 20 and the electrical connections of its connection contacts having been carried out, this component 20 is clad in a molding 30 of epoxy resin known per se in the step shown in FIG. 9-3. In a manner known per se, this molding 30 can be carried out on a single surface of the card 200 as shown in FIGS. 9-3, 11 and 12, or on opposite sides of the card 200 as shown in FIG. 13b, which permits ensuring a better mechanical grip and a better sealing.

The following steps are adapted to constitute the electrochemical couple of the cell from the card 200 used as a support for the collector 225.

Figure 4:
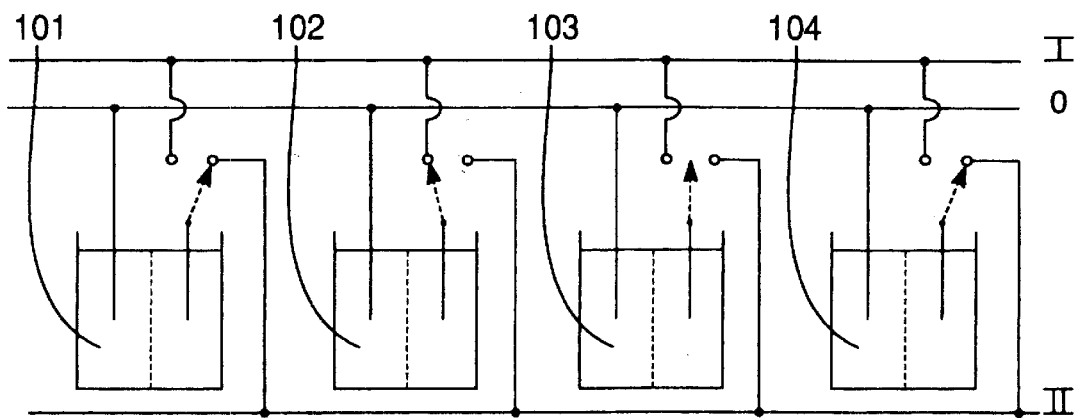
FIG. 4 shows a parallel mounting of four elements in which it will be seen that the cells (101) and (104) are connected in parallel between the lines (0) and (II), whilst the cell (102) is connected in parallel between the lines (0) and (I) and that the cell (103) is on standby either as an energy reserve or in case of malfunction. This energy source is thus separated into two energy supply lines.

In the step shown in FIG. 9-4, one of the electrodes, 13, is formed by deposition of material on the upper cladding 225 of the card 200 which thus constitutes the collector of this electrode.

Figure 5:
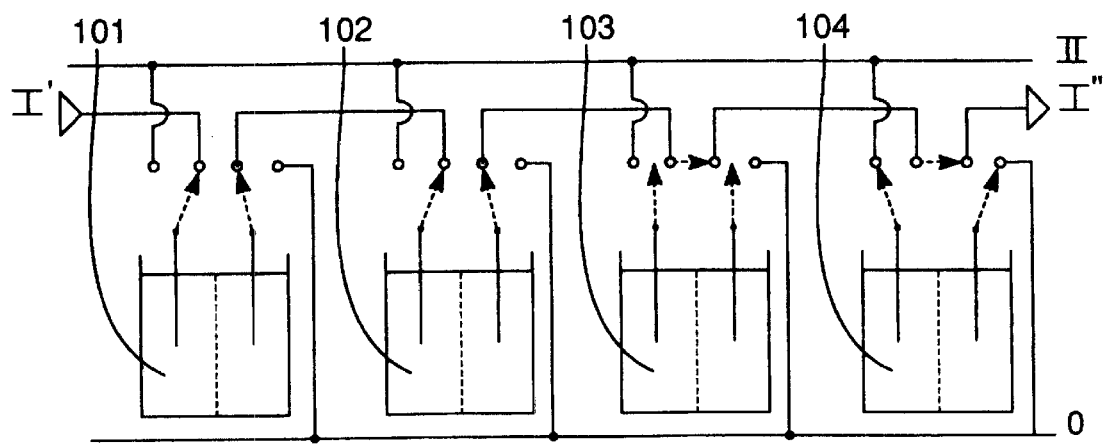
FIG. 5 shows a mixed mounting of four elements in which it will be seen that the cells (101) and (102) are connected in series between the points (I') and (I") and the line (1), whilst the cell (104) is connected in parallel between the lines (0) and (II) and that the cell (103) is on standby either as an energy reserve or in case of malfunction.
Figure 6:
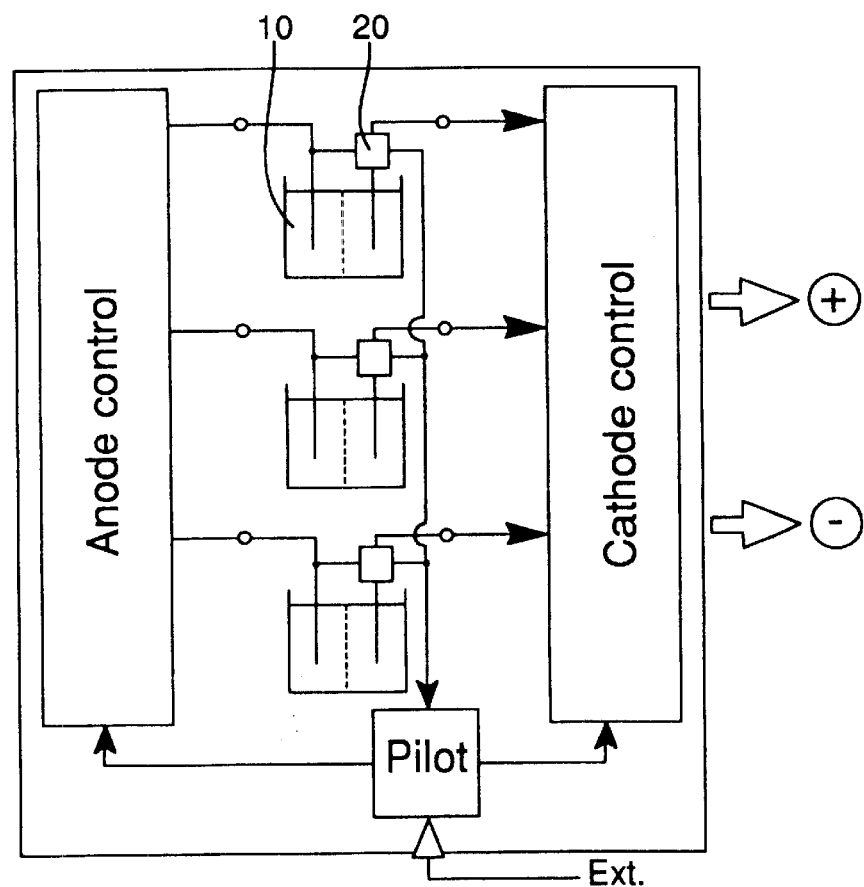
FIG. 6 shows a battery with three cells (10), each provided with an intelligent component (20) in an automatic control structure for the energy source.

The electrolyte 12 and the second electrode 11 are then positioned on the electrode 13 during the steps shown in FIGS. 9-5 and 9-6.

Figure 7:
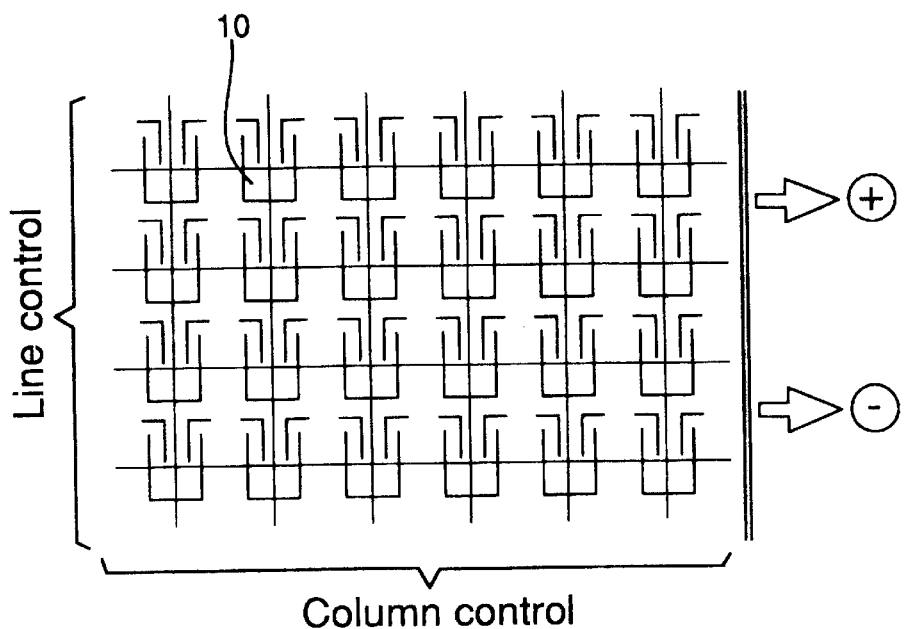
FIG. 7 shows a matrix of 24 intelligent cells (10), in an automatic distribution structure, of the whole, or of a portion of the energy sources, toward one or several points of use.

In the step shown by FIG. 9-7, there is produced the electrical connection symbolized by the drawing clamp 40 between one of the segments of the lower cladding 226, for example the segment 121, and the collector of the electrode 11.

This connection can be made by electrical contact, by vacuum deposition or by bending of a same substrate/current collector, of which half will be the anode and the other half the cathode.

Figure 11:
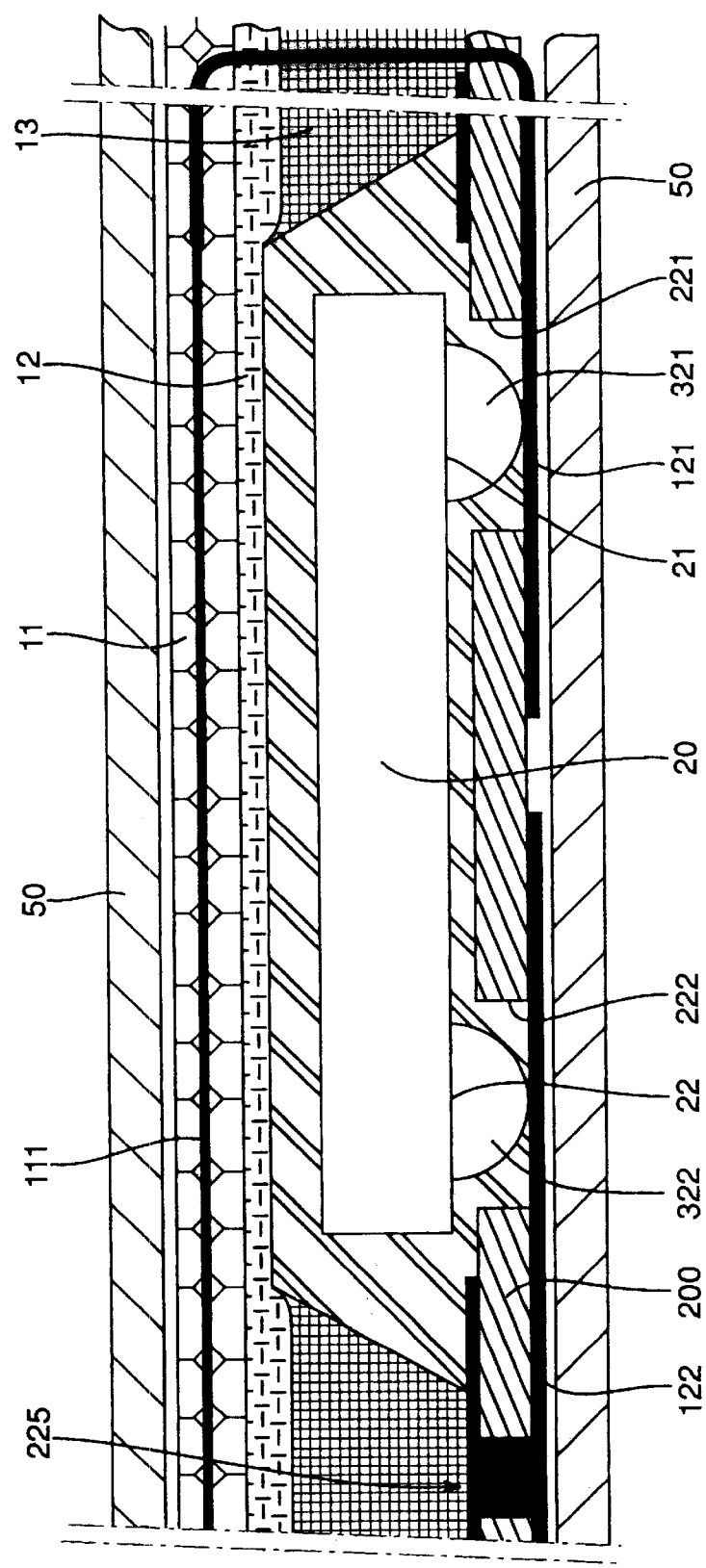

Such a connection is better seen in FIGS. 11 and 12, in which the conductor segment 121 is prolonged beyond the card 200 and bent upwardly to be connected electrically to the connector 111 of the electrode 11.

The electrochemical couple 100 enclosing the electronic component 20 is then completed. Said component 20 has its connection contact 22 electrically connected to one of the electrodes (13) by the connection 322 or 422, the segment 122 and the collector 225 and its contact 21 connected to the other, 11, of the electrodes by the connection 321, 421, the segment 121 and the collector 111. It is thus supplied with electric current by the direct connections to the electrodes of the electrochemical couple of the cell.

The production of the cell according to the invention is completed by the step shown in FIG. 9-8, in the course of which the electrochemical couple 100 is enclosed in a housing 50, preferably sealed.

According to a modified embodiment not shown in the drawing, in the case in which at least one of the electrodes is conductive in nature and fairly mechanically resistant, one end or the other of the collectors 111 and 225 is not used.

Figure 14:
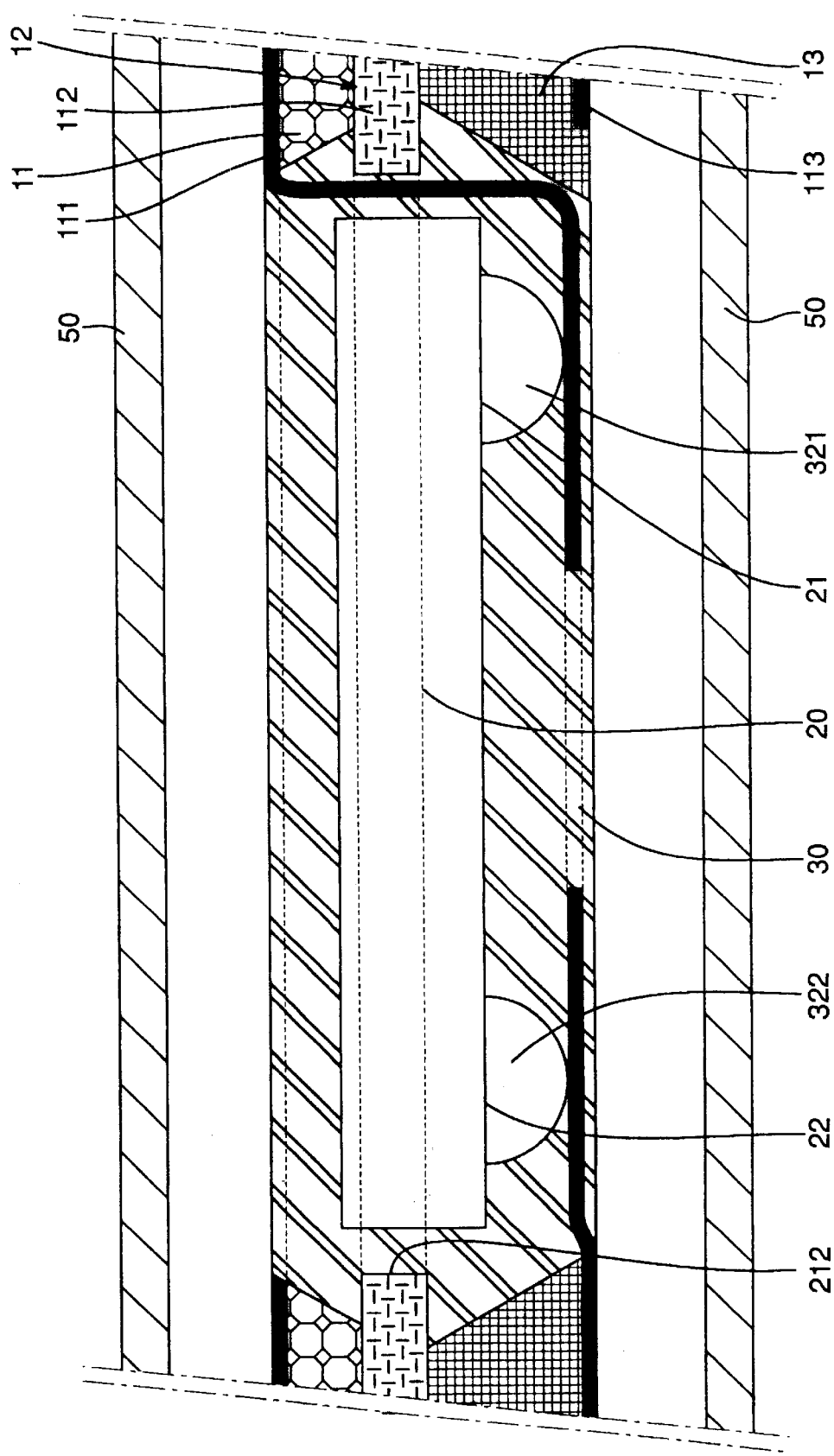
FIGS. 14 and 15 are views similar to FIGS. 11 and 12 for two modified embodiments of the invention.

FIG. 14 shows an example of an embodiment in which the electronic component 20 is fixed on the separator 112 of the electrolyte 12. In a manner known per se, the separator 112 of an electrolyte 12 is constituted by a sheet material, porous, which is saturated with a liquid electrolyte. Such a separator has no electrical function in the generator but constitutes a mechanical support adapted to maintain the electrodes 11 and 13 spaced from each other so that they do not touch. The separators are generally used in flexible cells in which the electrodes could come into contact with each other during bending.

As seen in the drawing, the component 20 is positioned in an opening 212 formed in the separator 112 and has its connection contacts 21 and 22 electrically connected to the collectors 111 and 113 of the electrodes by means of microballs 321, 322. The protective molding 30 of said component 20 extends on opposite sides of the separator 112 and ensures the securement of the component 20 to said separator. The electrodes 11 and 13 are then constituted on opposite sides of the separator 112, in contact with the collectors 111 and 113.

Figure 15:
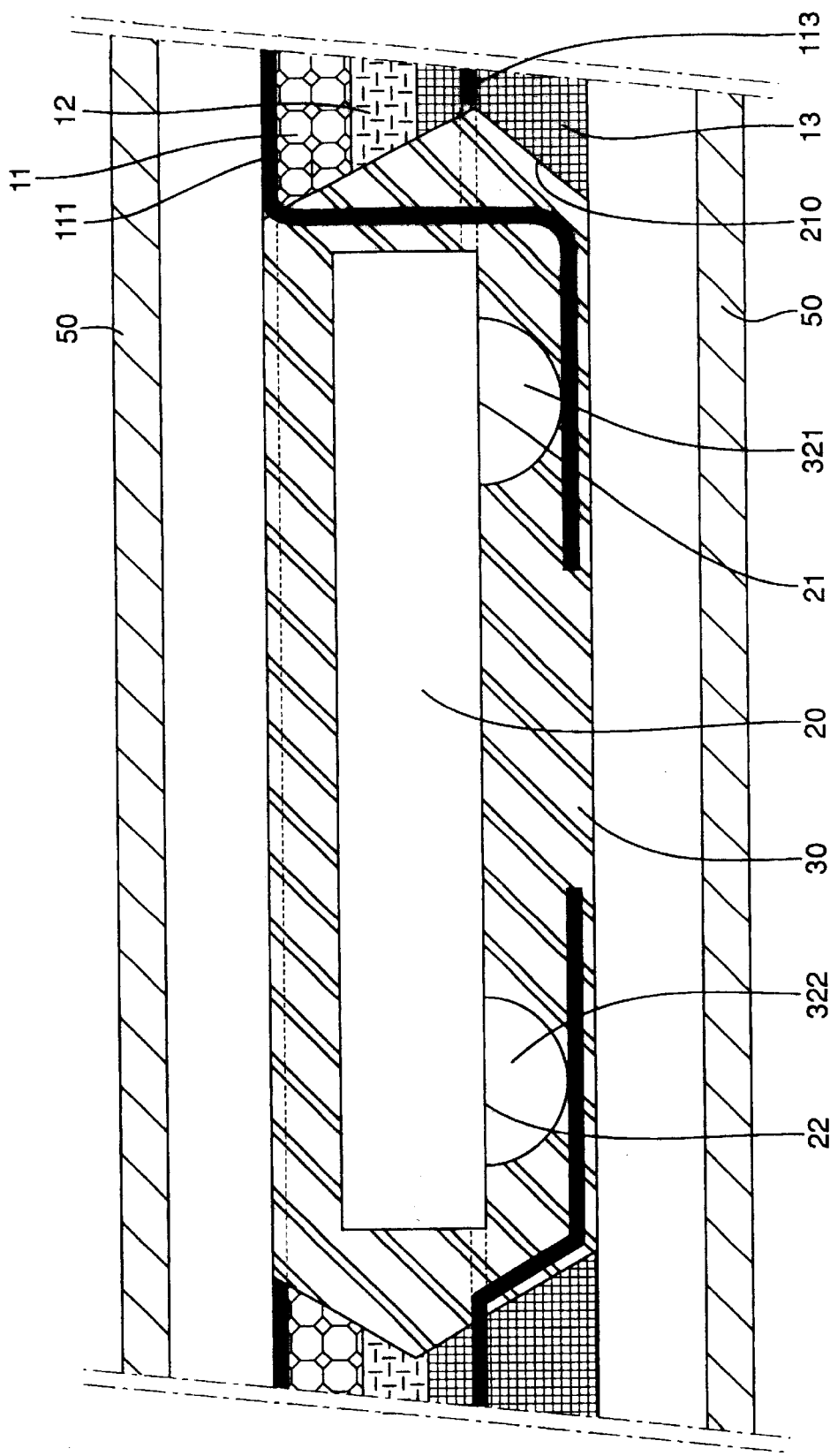

In the embodiment shown in FIG. 15, the electrochemical couple 100 is made by stacking elements constituting the electrode 13 with its collector 113, the electrolyte 12 and the electrode 11 with its collector 111, so as to leave an empty cavity 210. In this cavity, there is positioned a portion of the collector 113 and a portion of the collector 111, the contacts 21 and 22 of an electronic component 20 are connected to said collectors by means of connections 321, 322 and the cavity is filled with resin so as to constitute the protective molding 30 of said component 20.

In the preceding description, the nature of the electrolyte has not been mentioned, the latter being adapted, in a manner known per se, to have the consistency of a liquid or a gel because, apart from the requirement to constitute a sealed housing 50, the process of assembly remains the same.

The use of an air cathode (example: zinc/air battery), on the other hand, substantially modifies the order of the steps of the assembly process but is not inconsistent with the principle of the invention.

In the embodiments described, the chip, and hence the support, comprise four contacts 21 to 24, of which two, 21 and 22, ensure the energy supply to the component 20.

The other connection contacts and the segments connected thereto are used and connected as a function of the tasks they must perform. The component 20 can for example perform the function of analyzing a parameter such as temperature, pressure, voltage, current quantity within the electrochemical couple, and transmit this information to external control means.

This information is sent toward the external means by a process, known per se, of radio frequency modulation superposed on the supply voltage, through connections of the component 20 to the electrodes and the electrical connection wires, not shown in the drawing, connecting the electrodes of the electrochemical couple to the terminals of the cell. Conversely, the external control means can in the same way send instructions to component 20.

In fact, the number of contacts of the chip is not limited, because it depends on the number of parameters of the cell, that it is desired to control, and on the complexity of the electronics that are to be installed.

The minimum number is three contacts, in the case of auto-controlled cell without any interconnection, nor with adjacent cells, nor with the exterior of the battery (example: voltage regulator, current generator, pulse generator . . . )

The number of connections of the battery is two, at least, for the anode and the cathode, give that in certain cases, the connection of the anode or that of the cathode can also be used to transport the control signal which is thus superposed on the energy supply signal.

For purposes of clarity, we have selected a multi-layer current collector constituted by an insulating support and a conductive printing (or metallization) on each surface.

In a manner known per se, on a uniformly conductive current collector, it is necessary to deposit an intermediate insulating layer (of the Kapton type, for example) to insulate the electronic components of the active elements of the cell and to constitute the different connections.

Figure 2:
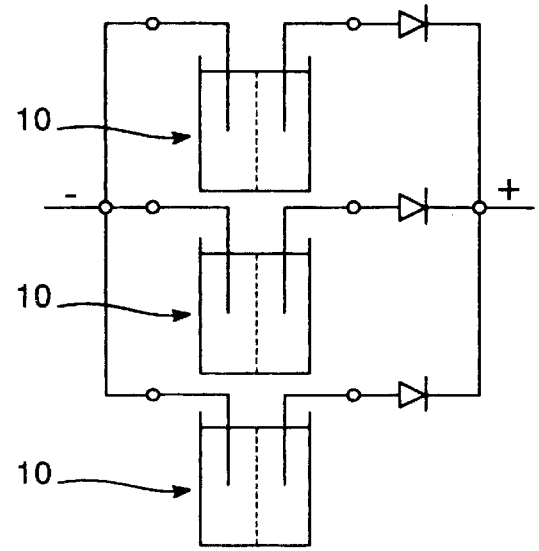

According to the angle from which the invention is considered, three large types of industrial applications will be clearly seen:
  smart batteries,
  the control of matrices of cells,
  microsources of energy
The Smart Batteries, In the case of a battery, rechargeable or not, comprising a series of cells juxtaposed according to FIG. 1 or FIG. 2, the presence of a smart chip on each cell permits observing the essential parameters of operation of each of the generators, and to intervene separately on the supply of energy of each of the generators and hence overall to control the energy source.

FIGS. 3 to 5 show non-exhaustive examples of the control of energy sources in "all or nothing". The connections are provided by the smart element of each cell as a function of the parameters belonging to the generator itself or to instructions supplied by means external to each smart element.

The use of cells according to the invention thus permits identifying, at any time, each cell and attributing to it a use, series or parallel, toward one point or another, without this attribution being definitive.

The process according to the invention also permits controlling certain well-known defects of assemblies comprising cells.

Without limitation, there could be cited for example:
- in all vehicles having a battery, the overall charging current of the rechargeable battery can be controlled, which ensures a good overall operation of this battery but does not permit foreseeing the imminent failure due to malfunction of a single battery cell, nor to know the quantity of energy effectively available in the battery. The control, element by element, permits managing this type of situation.
- similarly, a rechargeable battery could be provided with a discharge signal which will be triggered not at an overall voltage value but rather when one of the cells has reached its minimum discharge threshold, even if the good operation of the other cells hides this local malfunction.

In the case of use in northern countries (lower temperatures), the rechargeable batteries can be provided with a self-supplied preheating element which will be triggered by at least one of the smart cells preventing the supply of energy to the starter until all the battery cells and the electrolyte have reached a suitable temperature to supply the maximum electrical energy.

A preheating signal of the cells, similar to or coupled with the preheating signal of diesel motor plugs, can be sent directly from the generator to the dashboard of the vehicle.

Similarly, a charger could monitor the exact charging state of a rechargeable battery thanks to the simultaneous detection, cell by cell, of the derivative of the voltage curve, of the derivative of the temperature curve and of the differential between the energy supplied and the energy returned at the level of each cell.

The Management of Matrices of Battery Cells

The preceding examples are applicable to batteries, rechargeable or not, comprising a limited number of battery cells.

In the case of the use of a large number of cells, as in batteries for electrical vehicles, all the small imperfections of operation cited above (and others . . . ) are multiplied by the number of cells and thus become intolerable. By way of example, the lighting of the headlights must not cause the speed of the vehicle to drop. The failure of a cell should be signalled without leading to an overall breakdown.

The fact of providing battery cells with intelligence permits controlling where, when and how each cell distributes energy, in a structure designed for this purpose.

FIG. 6 schematically shows the architecture of a system of managing with three cells, and the distribution, at any moment, of the available current toward one source of use as a function of a pilot which manages the information from these cells and takes account if need be of external elements.

By such a process, it is thus possible to connect or disconnect one of the cells whilst guaranteeing the overall supply of energy, to the extent of course to which redundant elements are available to supply to the failed elements or to supply supplemental energy.

In a more general matrix configuration, it becomes possible to distribute the use of the various cells toward one or several separate points of energy consumption and to redistribute these cells to the extent there is a demand as a function of the needs of the moment.

All or a portion of the matrix can be attributed, in an evolutive fashion, to all or a portion of the points of energy usage.

In FIG. 7, it will be understood that a microprocessor is completely able to manage such a matrix by overseeing the cells in turn and to use the data thus recovered to organize the distribution of the energy sources.

In such a system, there can even be envisaged that certain generators will be in the course of recharging, whilst certain are inactive and that others dispense energy, each generator being individually controlled.

Energy Microsources

It is known that there is an unbalance between the electronic components which have made enormous progress these last 20 years, in terms of miniaturization, reduction of cost, reduction of consumption, and the sources of electrical energy which, during this same time period, are simply rendered more reliable.

We thus now find, in the reverse situation to that in which we were several tens of years ago, namely, that:
- the electronic apparatuses of small size, small energy consumption and small cost,
- the sources of energy are often over-dimensioned in terms of too great an energy supply, too much volume, too much weight, and too high a price compared to the price of a chip.

It is interesting to note that the price of a battery is not connected to the quantity of active material present in it, but much more to the cost of the housing itself and its assembly.

There can thus be created microsystems comprising a microsource of energy precisely adapted to its need and to its life span.

In this microsystem, the component not only controls the energy microsource, but also integrates all of the electronic functions of the microsystem.

What is claimed is:

1. Battery cell comprising:
    an electrochemical couple having two electrodes separated by an electrolyte; and
    an electronic circuit disposed inside said two electrodes of said electrochemical couple and electrically connected to the two electrodes.

2. Cell according to claim 1, characterized in that at least one of the electrodes (11, 13) comprising a current collector (111, 113, 225), the electronic circuit (20) is electrically connected to said collector (111, 113, 225).

3. Cell according to claim 2, characterized in that the electronic circuit (20) is fixed on a current collector (225).

4. Cell according to claim 3, characterized in that the current collector (225) is constituted by the metallic cladding (225) of a printed circuit card (200) on which is secured the electronic circuit (20).

5. Battery cell comprising an electrochemical couple having two electrodes separated by an electrolyte wherein the battery cell comprises an electronic circuit disposed within said electrochemical couple and electrically connected to the two electrodes,
    wherein at least one of the two electrodes comprises a current collector, the electronic circuit being electrically connected to said collector,
    wherein the electronic circuit is fixed on said current collector, wherein said current collector comprises a metallic cladding of a printed circuit card on which is secured the electronic circuit, and wherein the metallic cladding constituting the current collector covers the upper surface of the card, except for a central surface for the positioning.of the electronic circuit.

6. Cell according to claim 5, characterized in that the electronic circuit (20) has connection contacts (21, 22, 23, 24), openings (221, 222, 223, 224) are formed in the card (200) at the points at which will be positioned said connection contacts (21, 22, 23, 24), the lower surface of the card (200) carries a metallized cladding (226) constituted by segments (121, 122, 123, 124) independent from each other of which one is electrically connected to the cladding (225) of the upper surface through an opening (234) in the card (200).

7. Cell according to claim 6, characterized in that the connection contacts (21, 22, 23, 24) are connected to the segments (121, 122, 123, 124) of the metallized cladding (226) on the lower surface of the card (200) by microballs (321, 322, 323).

8. Cell according to claim 6, characterized in that the connection contacts (21, 22, 23, 24) are connected to the segments (121, 122, 123, 124) of the metallized cladding (226) on the lower surface of the card (200) by conductive wires (421, 422, 423, 424).

9. Cell according to claim 2, characterized in that the electrolyte (12) comprising a separator (112), the electronic circuit (20) is fixed on said separator (112).

10. Process for the production of a cell according to claim 3, characterized in that:

there is used a printed circuit card (200) whose upper surface carries a metallic cladding (225) adapted to constitute a current collector (225), said cladding covering the upper surface of said card (200) except for a central surface (220) adapted for the positioning of an electronic circuit (20) and whose lower surface carries a metallized cladding (226) constituted by segments (121, 122, 123, 124) independent from each other, of which one is electrically connected to the cladding (225) of the upper surface through an opening (234) in the card (200), there is used an electronic circuit (20) having connection contacts (21, 22, 23, 24), openings (221, 222, 223, 224) are formed in the card (200) at the points where said connection contacts (21, 22, 23, 24) will be located, the electronic circuit (20) is fixed on the printed circuit card (200), the connection contacts (21, 22, 23, 24) are electrically connected to the segments of the cladding (226) on the lower surface of the card (200), the electronic circuit (20) is clad in a protective molding (30), the electrochemical couple (100) of the cell on the card (200) used as a support for the collector (225) is constituted by forming a first electrode (13) by deposit of material on the upper surface of the card (200) then by positioning the electrolyte (12) and the second electrode (11) on said first electrode (13), an electrical connection is effected between one (121) of the segments of the lower cladding (226) and the electrode (11), an electrochemical couple (100) is enclosed in a housing.

11. Process for the production of a cell according to claim 9, characterized in that:

a separator (112) is used as electrolyte (12), an opening (212) in said separator (112) is cut out, an electronic circuit (20) is positioned in the opening (212) and its connection contacts (21, 22) are connected to current collectors (111, 113), a molding (30) is provided about said electronic circuit (20) so as to ensure its protection and its securement to said separator (112), the electrodes (11, 13) are disposed on opposite sides of the separator (112), in contact with the current collectors (111, 113), the electrochemical couple (100) is enclosed in a housing.

12. A process for the production of a battery cell, said battery cell comprising an electrochemical couple having two electrodes separated by an electrolyte and an electronic circuit disposed within said electrochemical couple and electrically connected to the two electrodes, wherein at least one of the two electrodes comprises a current collector, the electronic circuit being electrically connected to said collector, wherein the electrochemical couple is produced by the steps of:

stacking the elements comprising the first electrode with a first collector, the electrolyte and the second electrode with a second collector so as to leave an empty cavity, and by positioning in said cavity a portion of each of said first and second collectors, introducing the electronic circuit into the cavity, connecting connection contacts of said electronic circuit to said first and second collectors by first and second connections, filling the cavity with resin so as to constitute a protective molding of said electronic circuit, and enclosing the electrochemical couple in a housing.

13. Process for use in a cell according to claim 1, characterized in that the electronic circuit (20) performs an analysis function of at least one parameter of the electrochemical couple (100) and transmits this information to external control means.

14. Process for use according to claim 13, characterized in that the information is transmitted by a radio frequency modulation process superposed on the supply voltage, through connections of the electronic circuit (20) to the electrodes (11, 13) of the electrochemical couple (100) and the connections of the electrodes (11, 13) of the electrochemical couple (100) to the contacts of the cell.

15. Cell according to claim 1, wherein the electronic circuit comprises an electronic component directly contacting said electrolyte and at least one of said two electrodes.

* * * * *